(12) United States Patent
Bopp

(10) Patent No.: US 11,541,460 B2
(45) Date of Patent: Jan. 3, 2023

(54) CUTTING TOOL

(71) Applicant: GUEHRING KG, Albstadt (DE)

(72) Inventor: Michael Bopp, Sigmaringen-Laiz (DE)

(73) Assignee: Guehring KG, Albstadt (DE)

(*) Notice: Subject to any disclaimer, the term of this patent is extended or adjusted under 35 U.S.C. 154(b) by 508 days.

(21) Appl. No.: 16/594,956

(22) Filed: Oct. 7, 2019

(65) Prior Publication Data
US 2020/0108448 A1 Apr. 9, 2020

Related U.S. Application Data

(63) Continuation of application No. PCT/EP2018/064252, filed on May 30, 2018.

(30) Foreign Application Priority Data

Jun. 8, 2017 (DE) ..................... 10 2017 112 696.1

(51) Int. Cl.
B23C 5/28 (2006.01)
B23B 27/10 (2006.01)
B23B 51/06 (2006.01)

(52) U.S. Cl.
CPC .............. *B23B 27/10* (2013.01); *B23B 51/06* (2013.01); *B23C 5/28* (2013.01);
(Continued)

(58) Field of Classification Search
CPC . B23C 5/28; B23C 2230/045; B23C 2230/04; B23D 77/006; B23D 2277/30;
(Continued)

(56) References Cited

U.S. PATENT DOCUMENTS 4,966,503 A * 10/1990 Davidson ................ B23B 51/06
408/207
8,393,832 B2 3/2013 Kress
(Continued)

FOREIGN PATENT DOCUMENTS

DE 103 05 991 A1 12/2004
DE 10 2005 034 422 A1 1/2007
(Continued)

OTHER PUBLICATIONS

International Search Report and Written Opinion of the International Searching Authority from a corresponding international patent application (PCT/EP2018/064252) dated Sep. 11, 2018, 10 pages.

(Continued)

*Primary Examiner* — Alan Snyder
(74) *Attorney, Agent, or Firm* — Burr & Brown, PLLC

(57) ABSTRACT

A cutting tool comprising at least one blade arranged at an axial cutting head end of a tool carrier. The tool carrier comprises a chip-removal space that receives material chips removed by the blade. In some embodiments, the blade is adjacent to a chip passage feeding into the chip-removal space, which passage is limited by a radial chip gap partially limited by the blade and from there by a first and second passage surface, the first passage surface a continuation of the chip surface of the blade, the second passage surface running at an angle and widening relative to same, and is closed and limited at least in an axial sub-section facing the cutting head end, all around by a peripheral wall as a third passage surface, wherein at least one coolant channel is formed within the peripheral wall, which is provided to guide coolant to the cutting head end.

15 Claims, 7 Drawing Sheets

(52) U.S. Cl.
CPC ... *B23B 2200/323* (2013.01); *B23B 2200/328* (2013.01); *B23B 2250/12* (2013.01); *B23B 2251/50* (2013.01); *B23B 2270/30* (2013.01); *B23C 2250/12* (2013.01)

(58) Field of Classification Search
CPC ............ B23D 2277/60; B23B 2250/12; B23B 51/042; B23B 51/0486; B23B 51/06; B23B 2270/30
See application file for complete search history.

(56) References Cited

U.S. PATENT DOCUMENTS

| | | |
|---|---|---|
| 10,369,636 B2 | 8/2019 | Ach et al. |
| 2010/0260558 A1 | 10/2010 | Kress |
| 2015/0174671 A1 | 6/2015 | Maurer |
| 2015/0298221 A1 | 10/2015 | Ach et al. |
| 2019/0151960 A1 | 5/2019 | Schmid et al. |

FOREIGN PATENT DOCUMENTS

| | | | | |
|---|---|---|---|---|
| DE | 10 2010 021 212 A1 | 11/2011 | | |
| DE | 102013108825 B3 * | 10/2014 | ............ | B23D 77/14 |
| DE | 10 2013 114 792 A1 | 3/2015 | | |
| DE | 10 2014 207 510 A1 | 10/2015 | | |
| DE | 10 2016 111 671 B3 | 8/2017 | | |
| EP | 2 839 913 A1 | 2/2015 | | |
| WO | 2009/071288 A1 | 6/2009 | | |
| WO | 2018/019901 A1 | 2/2018 | | |
| WO | WO-2018077495 A1 * | 5/2018 | ......... | B23B 51/0486 |

OTHER PUBLICATIONS

DPMAregister printout from a corresponding German patent application (DE 10 2017 112 696.1) printed on Oct. 1, 2019, 2 pages.

* cited by examiner

CUTTING TOOL

The present invention relates to a cutting tool for chip-removing production and machining of recesses and/or depressions of a component to be processed, in particular for producing or post-processing a plug bore according to the present invention.

PRIOR ART

Generic cutting tools in the form of milling drills are used to produce bores, for example water plug bores in internal combustion engines. Such cutting tools in the form of reamer tools are further used for fine-processing bores by means of reaming. The surface quality as well as the dimensional accuracy of bores and recesses or depressions, respectively, in components to be processed is improved by means of the reaming process.

A bore or a recess in a component is usually produced in two or more operations. In a first operation, a bore or a recess in a component is initially introduced by means of a spiral drill or a milling drill, wherein the front and side surfaces of the bore or recess have a certain roughness. In a second operation, these surfaces are post-processed to a desired surface quality by means of a reamer tool, wherein only a few tenths of a millimeter of material are typically removed and tolerances IT7 to IT5, e.g., can be attained.

Water plug bore are provided in particular in engine construction, in order to provide cooling fluid-guiding recesses in the engine block. To post-process such water plug bores, single-stage or multi-stage reamer tools are used, which attain a high surface quality in the processing of such recesses and boring surfaces.

Generic cutting tools typically have blades on the circumference and/or on the ingate, i.e. on the head end of the tool. The cutting edges are usually aligned parallel or vertically, respectively, to an axis of rotation of the cutting tool. Typical diameters of such cutting tools lie between 1 mm and 50 mm, wherein the cutting head, which supports the blades, is usually made of solid carbide (SC).

Blades made of diamond have been known for a long time. More recently, a manufacture of blades of a hard crystal material, in particular a synthetically produced crystal cutting material has established itself, wherein, for example in the blade, diamond particles are embedded in a metal matrix, or a boron nitride blade is used. Diamond blades, PCD blades (polycrystalline diamond blades) or CBN blades (cubic crystalline boron nitride blades) are thus used in many cases, which are permanently fastened to the cutting head by means of soldering or welding or which are exchangeably attached to the cutting head by means of suitable fastening means.

Material chips, which can accumulate at the blades and the removal of which from the processing location takes place, for example, by means of coolant flushing or by means of repeated removal of the cutting tool from the bore and cleaning of the bore, result in the processing process. A reliable discharge of chips as part of a continuous processing and without complex cleaning measures is only possible to an unsatisfactory extent with the currently known cutting tools. An ultrapure processing of the engine block interior is strived for especially in a processing of engine blocks, so that chips are to be discharged reliably.

A reamer tool is known from WO 2009/071288 A1, which, to guide chips, has a chip guiding element comprising a guide surface, which forms a slit-shaped receiving space with a chip surface of the blade. The chip guiding element is formed in a cuboid shape and has a flat guide surface, which, with a chip surface connecting to the cutting insert on the rear, forms a receiving duct, which adjoins the receiving gap. In this receiving gap, the chips are deflected and discharged in the direction of a side surface of the chip space adjacent to the cutting insert.

DE 10 2005 034 422 A1 discloses a reamer for machining bores in workpieces, which are difficult to cut. The tool comprises at least one cutting insert comprising a blade and at least one guide strip. With the help of the guide strip, the reamer is guided in the bore, which is to be processed.

DE 10 2013 114 792 A1 shows a machining tool in the form of a drill comprising internal cooling and inner chip discharge. The drill shank is formed cylindrically and has evenly distributed diamond blades on the front-side end. For the cooling, a plurality of cooling ducts run in the wall of the drill shank, wherein each duct has a coolant inflow duct as well as a coolant return duct. The drill shank is connected to a machine tool via an adapter. A single coolant inflow duct as well as a single coolant return duct is arranged in this adapter. The adapter is connected to the drill shank via a flange connection. The inner chip discharge takes place via the extraction duct as well as via suction openings, which are arranged in a side wall of the adapter.

DE 103 05 991 A1 discloses a milling tool comprising an extraction device and a tool head. The extraction device is clipped onto the tool body. The extraction takes place via the extraction ducts, which run helically in the tool shank, as well as via slits, which are connected to the blades. The tool head has a central cooling duct, which divides into individual grooves on the front side of the tool shank and which is guided to the individual blades in this way.

A machining tool as well as a method for producing a machining tool by means of a 3D printing method are disclosed in DE 10 2014 207 510 A1.

A further generic cutting tool comprising a chip guiding element is known from EP 2 839 913 A1.

It is the object of the invention to create a cutting tool of the above-mentioned type, which has an improved chip guidance and which minimizes the risk that chips remain in the processing space.

DISCLOSURE OF THE INVENTION

The object is solved by means of a cutting tool in accordance with the present invention. Advantageous embodiments of the invention are described herein.

The cutting tool according to the invention, in particular for producing or post-processing a plug bore, comprises a clamping shank and a tool carrier comprising a cutting head and at least one blade, which is arranged at an axial cutting head end of the tool carrier, wherein the tool carrier comprises a chip-receiving space, which is molded to receive material chips of a component to be processed removed by the blade.

It is proposed that a respective chip passage, which feeds into the chip-receiving space and which is limited by a chip gap, which runs radially and which is partially limited by the blade, and from there by a first and second passage surface extending in the direction of the chip-receiving space, adjoins the at least one blade, wherein the first passage surface is a continuation of the chip surface of the blade, and the second passage surface runs at an incline and widening thereto, and is formed to be limited and closed circumferentially at least in an axial sub-section facing the cutting head end by a circumferential wall as third passage surface, wherein at least one coolant duct, which is provided to guide coolant to the cutting head end, is formed within the circumferential wall.

A cutting tool is created with the present invention, which has a chip-receiving space, which is completely closed circumferentially at least in an axial sub-section adjoining the cutting head end. The closed chip-receiving space has the effect that material chips, which are lifted off of a cutting edge of the blade on the component to be processed, are removed reliably from the processed bore. It is virtually impossible that chips, which enter into the chip-receiving space, can reach from the latter axially forwards into the processing region again. It is further prevented that material chips on the circumferential side of the cutting tool can come into contact there with the side wall, which has already been processed, of the bore to be processed. It is prevented thereby that the material chips can get caught on the side wall of the component to be processed and can thus possibly negatively impact the quality of the surface, which has already been processed.

To transport chips, which are milled off a cutting of the cutting insert on the component to be processed, into the chip-receiving space, a chip guiding passage is arranged in the region of the cutting insert, which defines a chip passage with respect to the cutting insert. The chip passage has a chip gap, into which chips can penetrate.

A respective chip passage, which feeds into the chip-receiving space and which is limited by a chip gap, which runs radially and which is partially limited by the blade, and at least by a first and a second passage surface extending in the direction of the clamping shank, as well as by a circumferential wall as third passage surface, adjoins the at least one blade. The first passage surface is defined by a chip shoulder of the blade and by the chip entraining surface adjoining the chip shoulder. The second passage surface is formed in such a way that it widens the chip passage in the direction of the clamping shank towards the chip-receiving space. A funnel, which widens in the direction of the chip-receiving space, is thus formed, through which material chips removed by the cutting edge are pushed in the direction of the chip-receiving space by means of the rotational movement of the cutting tool, and are guided away from the cutting edge. Chips are discharged from the processing location into the chip-receiving space, so that the milling region remains free from chips, no chip accumulation occurs, and a consistent high quality of the friction point is attained. An increased heat development is prevented and the service life of the cutting or reamer tool is increased. A third passage surface limits the chip passage on the circumferential side of the cutting tool. The closed chip passage forms a type of nozzle, which discharged coolant supplied to the cutting edges, together with the material chips, in the desired direction. Finally, the risk that material chips inadvertently fall back into the bore when pulling the cutting tool out of the bore, and negatively impact function of the component during the subsequent operation, decreases, which is advantageous in particular when processing water plug bores in engine blocks.

The complete cutting head comprising the chip-receiving space as well as the passage surfaces is preferably formed in one piece and is preferably produced in one piece. The production of such an element, which is closed by means of the circumferential side and which has a chip passage comprising specially formed passage surfaces in the interior, can take place, for example, by means of an additive manufacturing method. Such an additive manufacturing method provides for the production of passage surfaces of arbitrarily inclined passage surfaces in the interior of the chip-receiving space.

One or a plurality of coolant ducts, via which coolant can be supplied to the cutting head end or to the blades, respectively, are further formed in the circumferential wall. In the region of the tool carrier, the at least one coolant duct is preferably not arranged centrically, i.e. not on the axis of rotation of the tool carrier. Said coolant duct runs in the circumferential wall, i.e. in the wall of the hollow cylinder, wherein this hollow cylinder can be formed variably across the length of the tool carrier. For example the geometry of the hollow cylinder per se as well as the wall thickness of the circumferential wall can thus change.

The coolant duct or ducts cannot only be formed as tube-shaped or capillary-shaped ducts, but can extend in the circumferential direction across a significant angular range, for example by more than one-fourth in total, more than half, or even more than three-fourths of the total angular range of 360°. Coolant ducts, which can have a relatively small expansion in the radial direction, for example 2 mm or less, preferably 1 mm or less, and in particular even 0.5 mm or less, can be created in this way. The thickness of the circumferential wall can be kept small thereby, so that the chip-receiving space has the largest possible cross section, based on the total cross section of the cutting head, in order to provide for an efficient removal of material chips. The cutting tool according to the invention thus has a fluidically favorable chip-receiving space, which also reliably receives and removes larger material chips. Compared to conventional cutting tools, which have a central coolant duct and, according to the number of the blades, often two or more chip-receiving spaces, which are located radially on the outside and which are arranged around the coolant duct, the transport even of larger material chips improves by means of the creation of a chip-receiving space according to the invention comprising a large cross section.

An efficient and also even cooling of the cutting head is also attained by means of the circumferential wall of the cutting head, through which coolant flows.

The blade can be formed as exchangeable blade, in particular cutting insert, or can be firmly connected, in particular soldered, to the cutting head. The number of the blades can in particular be two, wherein cutting tools comprising a larger number of blades, e.g. three or four, can also be realized. The blades can be arranged in such a way that they cut over center or also not over center.

The distance of the chip outlet opening to the front side of the cutting head is advantageously chosen in such a way that it is larger than the maximum depth of the bores in the workpiece, which are to be processed, so that the chips can escape unhindered.

The tool carrier is formed in one piece. This means that the region, comprising the cutting head comprising the circumferential wall, the chip-receiving space, as well as the chip outlet opening, is formed in one piece. This complete region consists of a part, which can be connected to the clamping section, for example directly. This tool carrier can thus be applied or fastened, respectively, to any clamping section. This can take place, for example, by means of an additive manufacturing method, in particular selective laser melting, by applying material to the clamping shank.

Such a cutting tool can be clamped into any machine tools, wherein cutting cools comprising different diameters or comprising a chip-receiving space of any diameter, respectively, can be used flexibly.

This results from the fact that the tool can be installed in any receptacles of a machine tool, wherein the clamping shank is formed independently of the diameter of the chip-receiving space. A connection region or an additional adapter, respectively, for discharging the chips is not necessary thereby, because the chip discharge takes place in the region of the one-piece tool shank, which has the chip outlet openings. The chip discharge thus takes place in a region in the length of the tool shank.

The one-piece design saves the use of connecting means as well as the presence of connecting joints, whereby a chip discharge without leakage or unwanted outlet regions, respectively, or loss draft can be ensured.

The use of seals, which would be required in the case of additional connecting regions with additional connecting means, in order to ensure an optimal chip discharge without losses, can likewise be saved.

The blades can furthermore be detachably installed and can be formed so as not to be in one piece with the tool carrier.

At least two chip outlet openings, which are preferably arranged opposite one another in the circumferential wall, are advantageously provided in the circumferential wall on an end of the tool carrier facing the clamping shank.

According to an advantageous embodiment, at least one chip outlet opening is provided in the circumferential wall on an end of the tool carrier facing the clamping shank. Coolant and/or material chips can leave the chip-receiving space again through the chip outlet opening. The chip outlet opening is preferably formed by a circumferential sub-section of the circumferential wall. The chip outlet opening can thereby have the shape of a section of a cylinder jacket surface. The circumferential geometry of the chip outlet opening can be formed arbitrarily. It is likewise conceivable that two chip outlet openings located opposite one another are arranged in the circumferential wall. A chip discharge, which is symmetrical with respect to the axis of rotation, from the chip-receiving space can be attained thereby. The two chip outlet openings are thereby preferably formed identically.

Advantageously, two chip outlet openings are provided, which are located opposite one another and which thus ensure an efficient removal of chips and/or coolant. The distance of the one or plurality of chip outlet openings to the front side of the cutting head is advantageously chosen in such a way that it is larger than the maximum depth of the bores in the workpiece, which are to be processed, so that the chips can escape unhindered.

It has proven to be advantageous in this context, when a chip guiding surface, which is inclined relative to a longitudinal axis of the cutting tool and which is formed to guide chips and/or coolant from the interior of the chip-receiving space to the outside, is provided in the interior of the chip-receiving space in the region of the chip outlet opening. The angle of inclination of the chip guiding surface can be, for example, approximately 45°. The chip guiding surface can in particular also be curved concavely, wherein the inclination of the chip guiding surface advantageously increases with respect to a longitudinal axis of the cutting tool, as the distance to the chip outlet opening decreases.

According to a further advantageous embodiment, a central coolant passage is provided in the clamping shank and a base section of the tool carrier, which coolant passage is connected to the at least one coolant duct in a transition region between the base section and the cutting head. The central coolant passage guides coolant to the coolant duct or ducts and is formed in such a way at least in the region of the clamping shank that a compatibility with a coolant supply of a tool receptacle, into which the clamping shank can be clamped, is at hand.

The first passage surface can advantageously comprise at least one sub-section of a chip entraining surface adjoining the blade, and the second passage surface can comprise a surface of a chip guiding section, which extends so as to be angled or curved at least section by section in the direction of the clamping shank, in order to widen the chip passage from the chip gap in the direction of the chip-receiving space.

According to a further advantageous embodiment, the blade comprises a first cutting edge on the axial cutting head end, and a second cutting edge in the region of the circumferential wall of the cutting head, wherein the chip gap extends along the first and the second cutting edge, so that the chip passage is open towards the circumferential wall of the tool carrier in the region of the second cutting edge. In other words, the chip passage is not limited in the circumferential direction in the region of the second cutting edge. It is ensured thereby that the material chips removed from the second cutting edge, which is provided circumferentially, can also enter reliably into the chip passage and are discharged therefrom.

According to a further advantageous embodiment, the blade has a chip surface, which forms a sub-section of the first passage surface, wherein the chip surface runs essentially flush with the first passage surface. The entire first passage surface is thus preferably flat, starting at the cutting edge, and runs in particular parallel to the longitudinal axis of the cutting tool. The first passage surface, however, can, for example, also have a step, which supports a chip break.

According to yet a further advantageous embodiment, the second passage surface has at least one coolant outlet, which fares the blade and which is connected to the coolant duct. The coolant outlet is advantageously formed in such a way that at least a portion of the escaping coolant hits the cutting edge in order to cool and to lubricate it. The escaping coolant furthermore supports a failure-free removal of the material chips.

The coolant outlet is advantageously formed as groove, which in particular runs parallel to a head cutting edge of the blade. Coolant is thereby distributed evenly across the cutting edge. In addition, one or both edges of the groove can act as chip breaking edge.

On principle, a plurality of coolant outlets can also be provided. Coolant outlets do not mandatorily need to be arranged only in the second passage surface, but can alternatively or additionally also be provided at another suitable location.

According to a further advantageous embodiment, the circumferential wall has a cross sectional widening, which is directed inwardly, in the region of the cutting head end, wherein the at least one coolant duct is curved in such a way that coolant also flows through the cross sectional widening. The mentioned cross sectional widening is understood to be an arrangement of additional material in the interior of the cutting head, so that the cross sectional surface of the chip-receiving space, thus of the hollow space, is reduced. The cross sectional widening ensures a reliable storage of the one or plurality of blades and a reliable deflection and transfer of the cutting forces to rear regions of the cutting tool. The flow-through of the cross sectional widening with coolant can be effected, for example, by means of a meander-shaped guidance of the coolant duct or ducts, wherein in particular one or a plurality of sub-sections of the coolant ducts effect a reversal of the flow direction of the coolant.

The tool carrier is advantageously produced by means of an additive manufacturing method, in particular by means of selective laser melting, by applying material to the clamping shank.

A production method for a cutting tool according to the invention is furthermore a subject matter of the invention.

It is proposed that the tool carrier is produced by means of an additive manufacturing method, in particular selective laser melting, by applying material to the clamping shank. Such manufacturing methods are suitable in particular way to create the partially complex structures of the tool carrier with manageable cost and manufacturing expenditure. The non-detachable connection between tool head or cutting head, respectively, and clamping shank likewise takes place as pat of the additive manufacture.

If, on its end located opposite the cutting head end, the cutting head merges into a base section of an enlarged cross section, which is connected to the clamping shank, this base section can likewise be produced by means of the additive manufacturing method.

In an advantageous embodiment of the method, a base section is provided between the clamping shank and the tool carrier, which base section has a central coolant duct, wherein the tool carrier is produced by means of an additive manufacturing method, in particular selective laser melting, by applying material to the base section. The base section can thereby be formed as described above and can have the same advantages.

DRAWINGS

Further advantages follow from the drawing and from the corresponding description of the drawing. Exemplary embodiments of the invention are illustrated in the drawing. The drawing, the description, and the claims include numerous features in combination. The person of skill in the art will advantageously also consider these features individually and will combine them to expedient further combinations.

Identical or similar components are numbered with identical reference numerals in the Figures.

Figure 1:
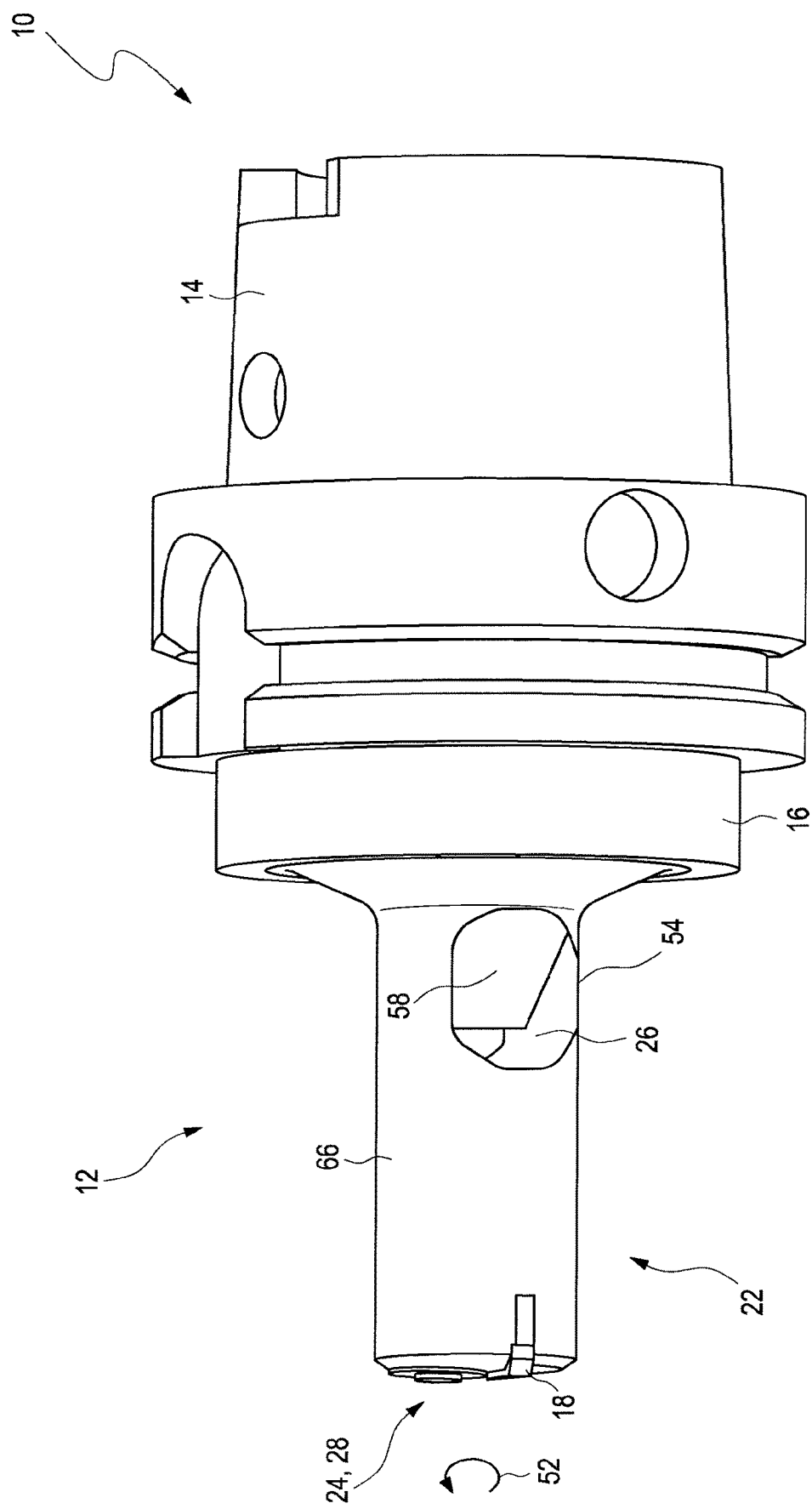
FIG. 1 shows a side view of an embodiment of a cutting tool according to the invention.
Figure 2:
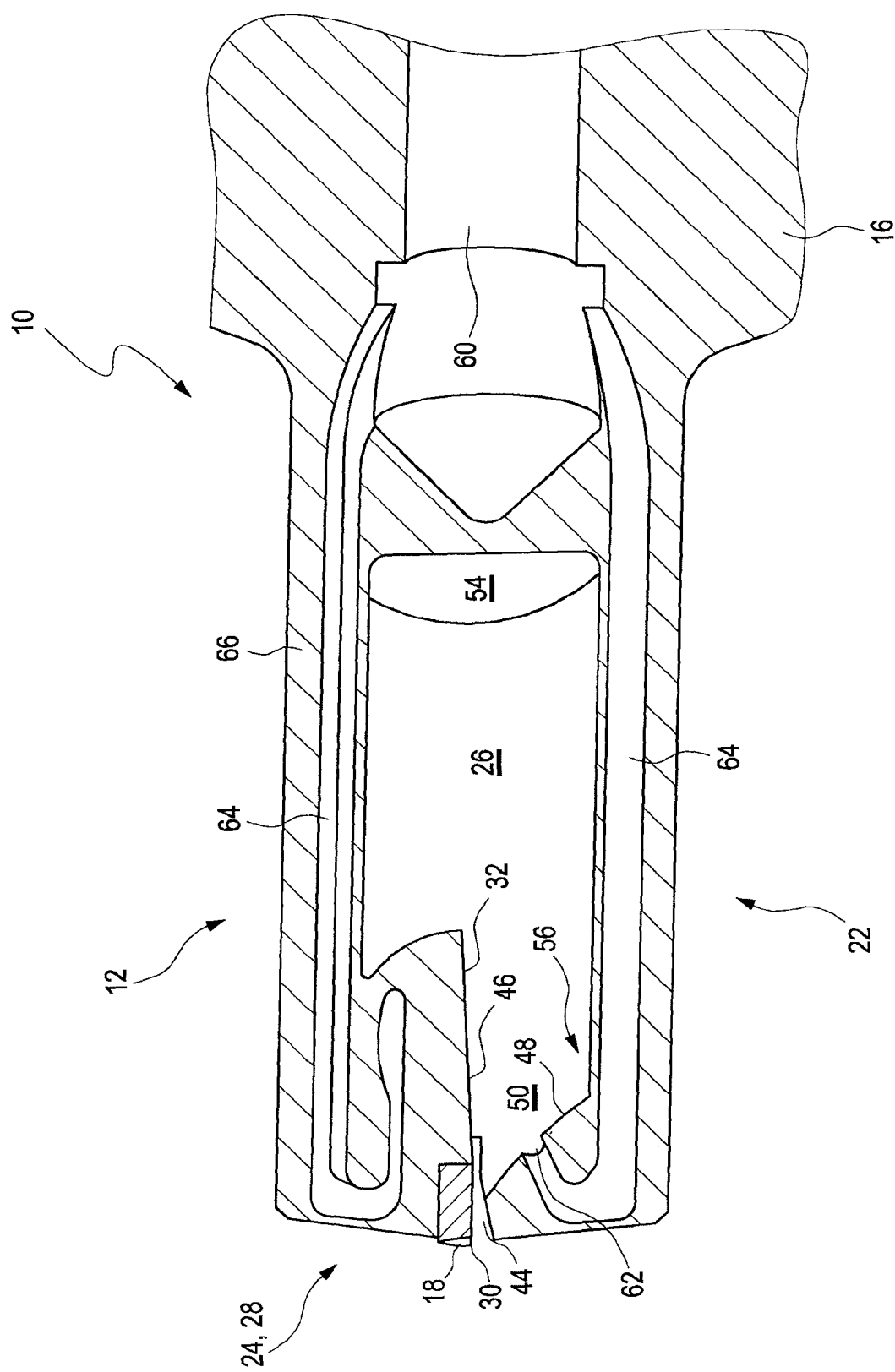
FIGS. 2 and 3 show sectional illustrations of the cutting tool of FIG. 1.
Figure 3:
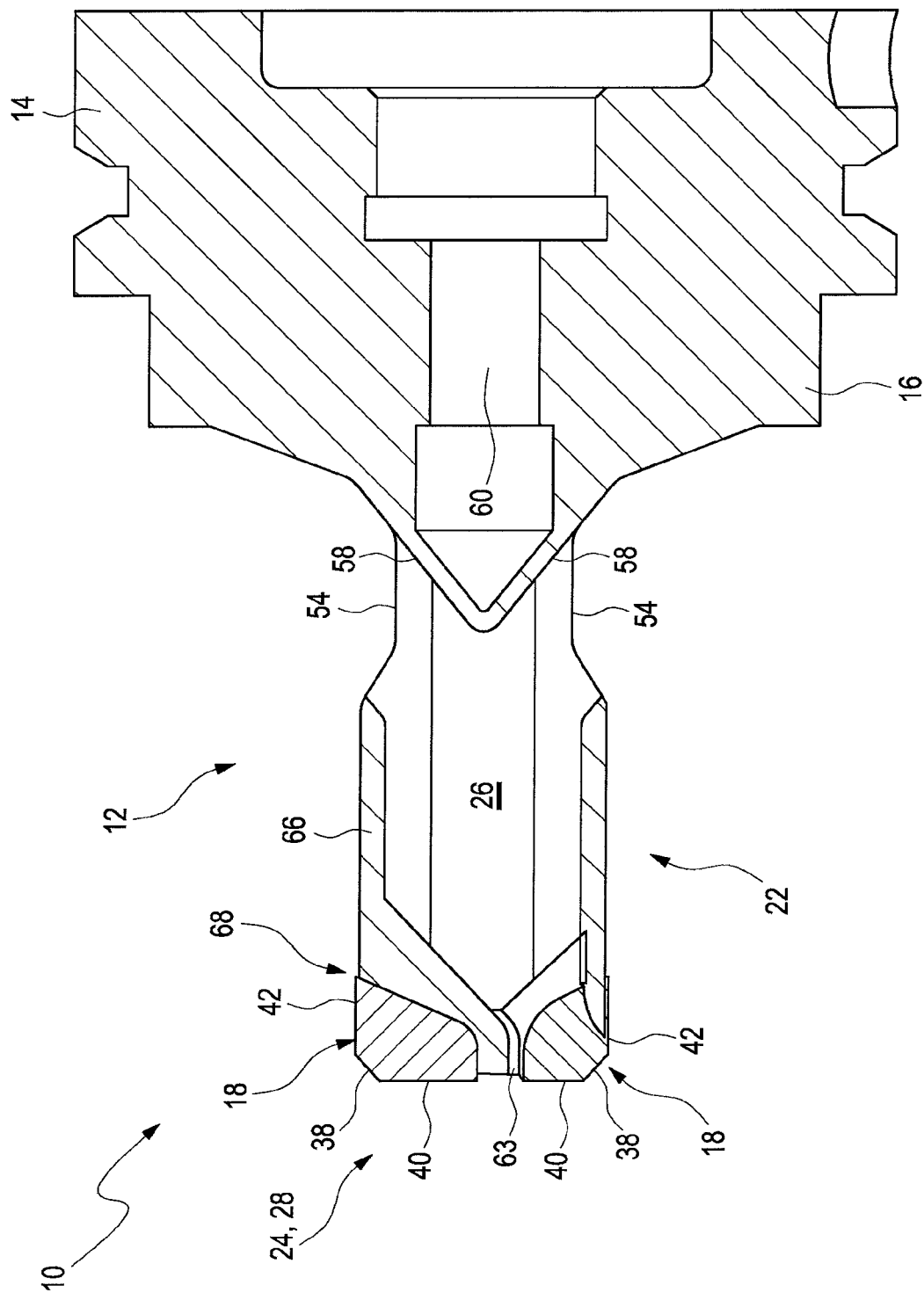
Figure 4:
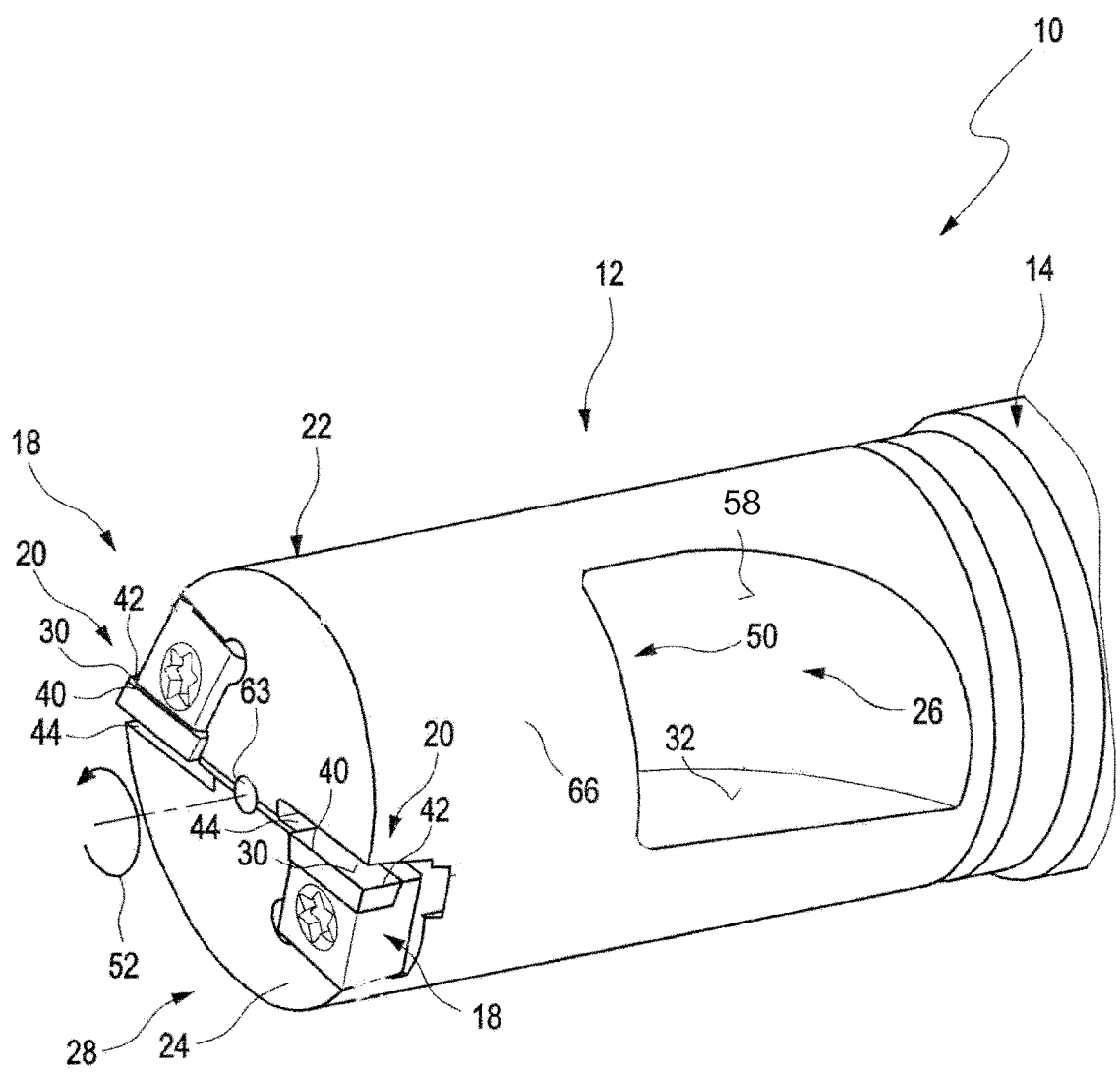
FIG. 4 shows a perspective view of a further embodiment of a cutting tool according to the invention.
Figure 5:
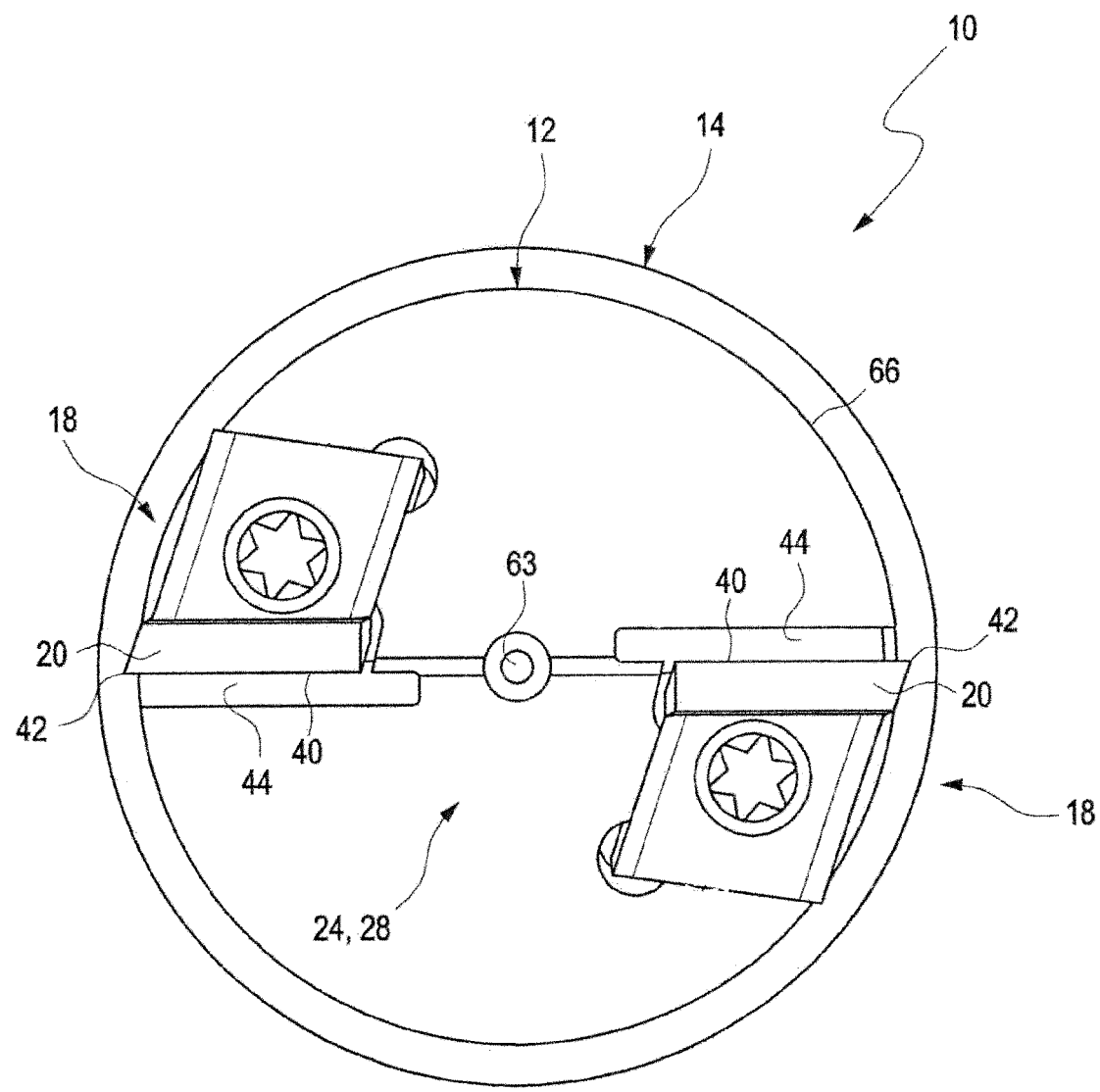
FIG. 5 shows a front-side view of the embodiment from FIG. 4.

FIGS. 1 to 3 show an exemplary embodiment of a cutting tool 10, which can be used, for example, as milling drill or reamer, in particular as water plug drill. The cutting tool 10 is moved in a rotational manner in an operational direction of rotation 52 for processing a component. It comprises a tool carrier 12 and a clamping shank 14, which can be clamped into a bore shank of a machine. The clamping shank 14 can in particular be formed as hollow shank taper for a hollow shank taper receptacle (HSK receptacle).

The tool carrier 12 comprises a cutting head 22, which comprises a central chip-receiving space 26 as well as a cutting region 28 on the cutting head end 24. This region is formed in one piece. Two blades 18, which can be sintered, for example, of a PCD or a CBN material, are fastened to the cutting head end 24. Each blade 18 has a side cutting edge 42 for cutting or reaming a circumferential bore surface, a head cutting edge 40 for cutting or reaming an ingate, and a chamfer cutting edge 38, which is inclined at an angle of approx. 45°, for cutting or reaming a chamfer of a component.

On its end opposite the cutting head end 24, the cutting head 22 merges into a base section 16, which has an enlarged cross section and which is connected to the clamping shank 14. On this base section, the cutting head can be produced, for example directly via an additive manufacturing method, wherein a non-detachable connection between the base section and the cutting head likewise takes place by means of this additive manufacturing method. The base section itself can likewise be produced by means of the additive manufacturing method and by means of the same manufacturing step as the cutting head or the tool carrier, respectively.

The chip-receiving space 26, which is cylindrical at least in sections, is defined by a circumferential wall 66, which, in a region adjoining the base section 16, has two chip outlet openings 54, which are located opposite one another and which provide for an outlet of material chips and coolant from the chip-receiving space 26. Respective chip guiding surfaces 58, which run at an incline with respect to the chip outlet openings 54 and which form a type of wedge and which guide the material chips or the coolant, respectively, in the direction of the chip outlet openings 54, are provided in the interior of the chip-receiving space 26.

As can be seen well in particular in FIG. 2, two coolant ducts 64, which are connected to a central coolant passage 60, which is provided in the clamping shank 14 and the base section 16, are formed in the interior of the circumferential wall 66. The coolant ducts 64 can extend across the circumference in sectors, so that the inner and outer wall of the circumferential wall 66 are only connected there via two relatively narrow webs.

The cutting region 28 comprises a region, in which the head cutting edges 40 process the ingate bottom of a depression, as well as a circumferential region, in which the side cutting edges 42 process a wall surface of the depression. The chamfer cutting edges 38 accordingly process a chamfer surface of the depression. Chips removed by the cutting edges 38, 40, can each enter through a chip gap 44 into a respective funnel-like chip passage 50 formed in the interior of the cutting head 22. Each chip passage 50 is limited by a first passage surface 46 and a second passage surface 48, and widens in a cross section in the direction of the clamping shank 14. The chip passages 50 feed into the chip-receiving space 26, so that chips can be transported through the chip passages 50 into the chip-receiving space 26.

As can be seen well in particular in FIG. 2, the chip surface 30 of the blade 18, together with the chip entraining surface 32, forms the first passage surface 46. A chip guiding section 56, which partially comprises an inner surface of the circumferential wall 66 and partially a second passage surface 48, which is inclined with respect to the first passage surface 46, is located opposite the first passage surface 46 or the chip entraining surface 32, so that the cross section of the chip passage 50 widens, viewed in the direction of the clamping shank 14.

In the region of the chip passage or of the chip entraining surface 32, respectively, the cutting head 22 has a cross sectional widening 58, which is directed inwards and which serves to fasten the blades 18 and to deflect the occurring cutting forces. In the region of this cross sectional widening 68, the coolant ducts 64 are guided in a meander-shaped manner, in order to ensure a sufficient cooling of the cutting head end 24 and to guide the coolant to coolant outlets 62, 63. On the one hand, the coolant ducts 64 feed into a central coolant outlet 63, which is provided on the front side of the cutting head end 24, via branch ducts, which are only illustrated in sections, and, on the other hand, into respective coolant outlets 62, which are provided in the second passage surface 48 and face a respective blade 18 and which can be formed as grooves running parallel to the head cutting edge 40. A coolant flow, which serves to lubricate and cool the cutting edges 38, 40, 42 and simultaneously supports the removal of the chips, is introduced through the coolant outlets 62, 63.

The completely closed shape of the chip passages 50 and of the adjoining chip-receiving space 26 thereby improves the flow pattern of the coolant-chip mixture and prevents that chips get caught circumferentially or that coolant escapes circumferentially from the chip-receiving space 26 or the chip passages, respectively. The longitudinal edges of the coolant outlets 62 running parallel to the head cutting edges 40 simultaneously act as chip breaking edges, which can entrain or break chips, respectively, in order to mold them as small as possible and to transport them through the chip passage 50 into the rearward chip-receiving space 26.

In the case of the cutting tool 10 according to the invention, an effective removal of chips into a rearward chip-receiving space 26 is promoted and the durability, the processing quality, and the operating speed of the cutting tool 10 is thus increased. The coolant ducts 64 running in the circumferential wall 26 thereby effect an efficient cooling of the cutting head 22 as well as a coolant supply to the coolant outlets 62, 63, which is efficient due to the large cross section.

FIGS. 4 to 7 show a further exemplary embodiment of a cutting tool 10. The cutting tool 10 is moved in a rotational manner in an operational direction of rotation 52 for processing a component. It comprises a tool carrier 12 and a clamping shank 14, which can be clamped into a bore shank of a machine. The clamping shank 14 can in particular be formed as hollow shank taper receptacle (HSK receptacle).

The tool carrier 12 comprises a cutting head 22, which comprises two central chip-receiving spaces 26 as well as a cutting region 28 on the cutting head end 24. Two blades 18, which each have a blade carrier, are screwed to the cutting head end 24. Each cutting insert 18 has a side cutting edge 42 for reaming a circumferential bore surface, and a head cutting edge 40 for reaming an ingate of a component.

Each chip-receiving space 26 is in each case defined by a flat chip entraining surface 32 and a chip guiding section 56, which is angled at a right angle thereto, wherein the chip guiding surface 58 is curved concavely in the direction of the clamping shank 14, in order to be able to transport received chips to the outside outside of the processing region. A removal of the chips from the processing region is thus attained by means of the chip guiding surface 58, which points to the outside.

The cutting region 28 comprises a region, in which the head cutting edges 40 ream on the ingate bottom of a depression, as well as a circumferential region, in which the side cutting edges 42 ream a wall surface of a bore or recess. Chips removed by the cutting edges 40, 42 can in each case enter through a chip gap 44 into a respective duct-like chip passage 50, which is formed in the interior of the cutting head 22. Each chip passage 50 is limited by a first passage surface 46 and a second passage surface 48 (both not visible in this illustration), and by a third passage surface in the form of the circumferential wall 66, and widens in its cross section in the direction of the clamping shank 14. The chip passage 50 feeds into the chip-receiving space 26, so that chips can be transported through the chip passage 50 into the chip-receiving space 26.

A chip guiding section 56 of the tool carrier 12 extending from the cutting head end 24 in the direction of the clamping shank 14 has the shape of a quarter section of a circular cylinder, wherein the first quartering surface thereof is cut, and the second quartering surface thereof runs in extension of the chip guiding section 56.

Figure 7:
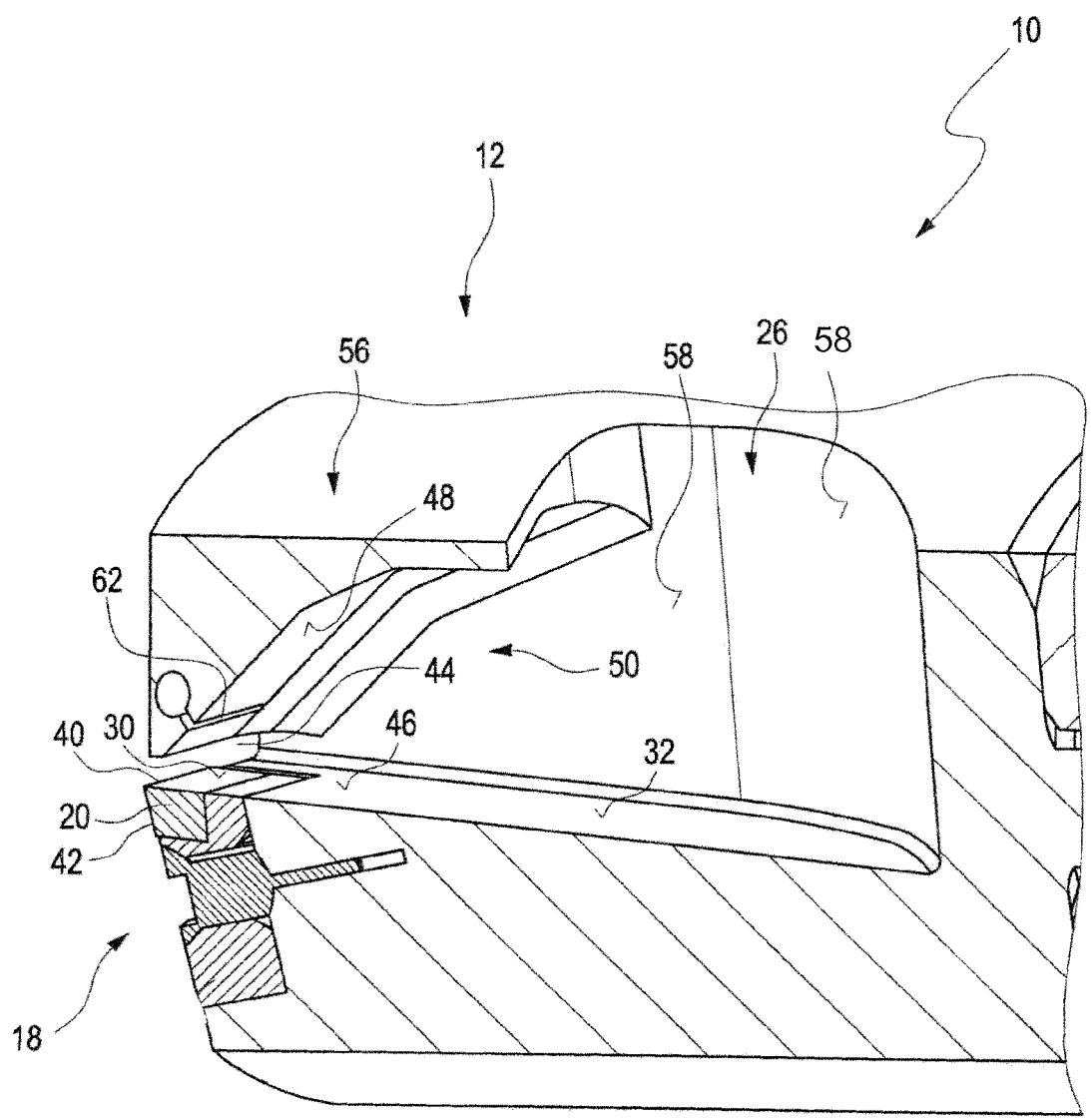

As can be seen well in particular in FIG. 7, the chip guiding surface 30, together with a sub-section of the chip entraining surface 32, forms the first passage surface 46. The cut first quartering surface of the chip guiding section 56 runs opposite the first passage surface 46 and forms the second passage surface 48, wherein the second passage surface 48 is inclined with respect to the first passage surface 46, and has a concave curvature, so that the cross section of the chip passage 50 widens, viewed in the direction of the clamping shank 14.

Figure 6:
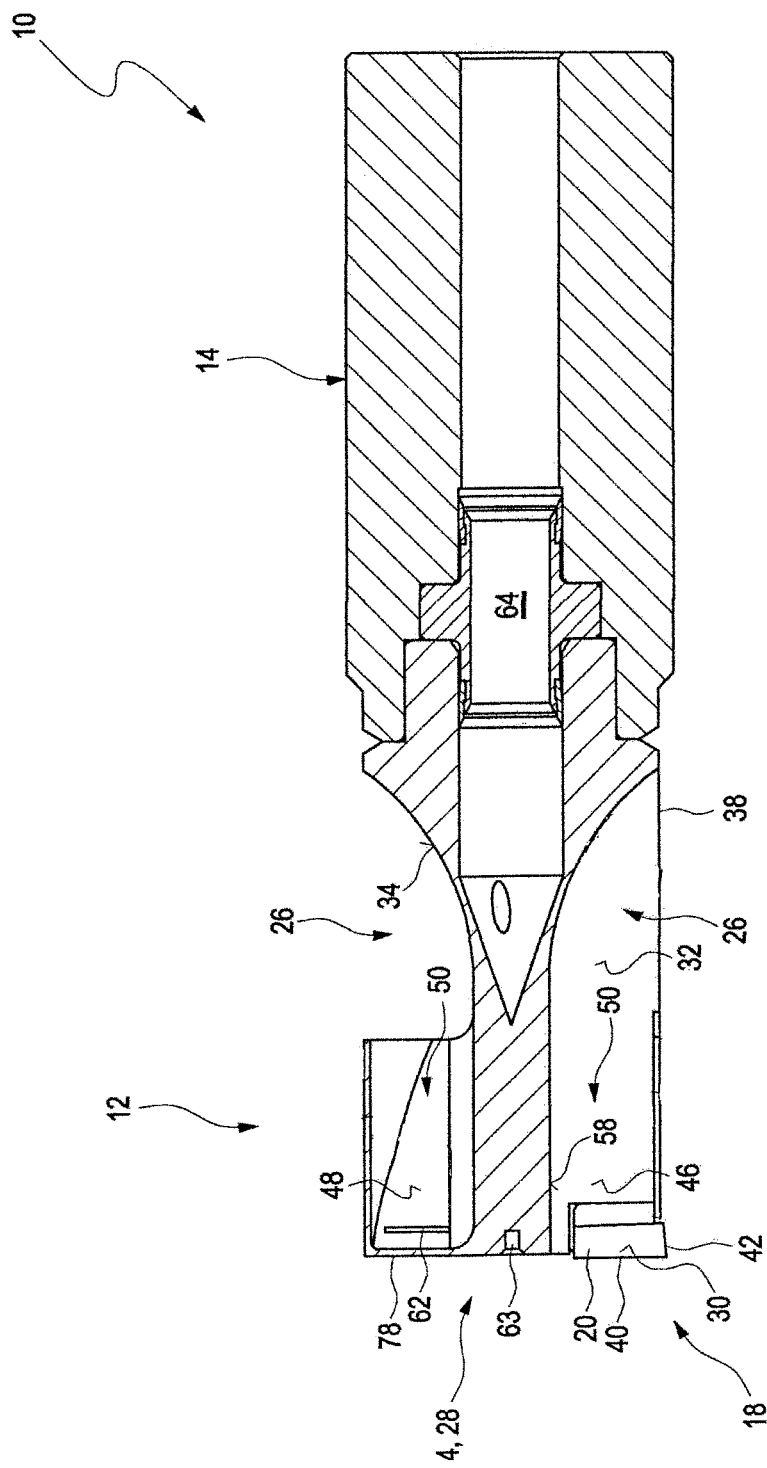
FIGS. 6 and 7 show sectional illustrations of the embodiment according to FIG. 4.

The circumferential wall 66 (cut away in the illustration of FIG. 7), which can be seen well in FIG. 6, directly adjoins the first and second passage surface 46, 48, and circumferentially limits the chip passage 50 to a majority of its length, i.e. between the chip gap 44 and the chip-receiving space 26. The chip gap 44 extends along the cutting edges 40, 42, so that the chip passage 50 is open towards the circumferential side 66 of the tool carrier 12 in the region of the side cutting edge 42.

Respective transitions between the passage surfaces 46, 48, 54, 58 can be formed to be edge-shaped or continuously, i.e. rounded or so as to merge into one another.

The cutting tool 10 has a coolant duct 66, which is formed as central axial bore and which extends through the clamping shank 14 and the tool carrier 12. On the one hand, the coolant duct 64 feeds into a central coolant outlet 63 provided on the front side of the cutting head end 24 via branch ducts, which are not illustrated in more detail, and, on the other hand, into a respective coolant outlet 62, which is provided in the second passage surface 48 and which faces the cutting insert 18 and which is formed as groove running parallel to the head cutting edge 40. A coolant flow, which serves to lubricate and cool the cutting edges 40, 42 and simultaneously supports the removal of the chips, is introduced through the coolant outlets 62, 63.

The closed shape of the chip passage 50 thereby improves the flow pattern of the coolant-chip mixture and prevents that chips get caught circumferentially or that coolant escapes circumferentially from the chip passage 50. The longitudinal edges of the coolant outlets 62 running parallel to the head cutting edges 40 simultaneously act as chip breaking edges, which can entrain or break chips, respectively, in order to form them as small as possible and to transport them through the chip passage 50 into the rearward chip-receiving space 26.

In the case of the cutting tool 10 according to the invention, an effective removal of chips into a rearward chip-receiving space 26 is promoted and the durability, the processing quality, and the operating speed of the cutting tool 10 is thus increased.

REFERENCE LIST 10 cutting tool
12 tool carrier
14 clamping shank
16 base section
18 blade 22 cutting head
24 cutting head end
26 chip-receiving space
28 cutting region
30 chip surface
32 chip entraining surface
38 chamber cutting edge
40 head cutting edge
42 side cutting edge
44 chip gap
46 first passage surface
48 second passage surface
50 chip passage
52 operational direction of rotation
54 chip outlet opening
56 chip guiding section
58 chip guiding surface
60 coolant passage
62, 63 coolant outlet
64 coolant duct
66 circumferential wall
68 cross sectional widening

The invention claimed is:

1. A cutting tool, comprising a clamping shank and a tool carrier comprising a cutting head and at least a first blade, the cutting head arranged at an axial cutting head end of the tool carrier, wherein:
the tool carrier comprises a chip-receiving space, which is molded to receive material chips of a component to be processed by the blade,
the tool carrier comprises a first chip gap defined in part by a first surface of the first blade,
chips are capable of passing from the first chip gap to the chip-receiving space by passing through at least a first passage,
the first passage is defined by at least a first passage first surface, a first passage second surface and a circumferential wall,
the first passage first surface defines a plane that includes the first surface of the first blade,
the first passage second surface runs at an incline and widens, relative to the first passage first surface, in a direction away from the first chip gap, and
at least a first coolant duct, which is provided to guide coolant to the cutting head end, is formed within a portion of the circumferential wall that closes the first passage circumferentially at least in an axial sub-section.

2. The cutting tool according to claim 1, wherein at least one chip outlet opening is provided in the circumferential wall on an end of the tool carrier facing the clamping shank.

3. The cutting tool according to claim 2, wherein a chip guiding surface, which is inclined relative to a longitudinal axis of the cutting tool and which is formed to guide chips and/or coolant from the interior of the chip-receiving space to the outside, is provided in the interior of the chip-receiving space in the region of the chip outlet opening.

4. The cutting tool according to claim 1, wherein a central coolant passage is provided in the clamping shank and a base section of the tool carrier, which coolant passage is connected to the at least one coolant duct in a transition region between the base section and the cutting head.

5. The cutting tool according to claim 1, wherein the first passage first surface comprises at least one sub-section of a chip entraining surface adjoining the blade, and the first passage second surface comprises a surface of a chip guiding section, which extends so as to be angled or curved at least section by section in the direction of the clamping shank, in order to widen the first passage from the chip gap in the direction of the chip-receiving space.

6. The cutting tool according to claim 5, wherein the blade comprises a first cutting edge on the axial cutting head end, and a second cutting edge in the region of the circumferential wall of the cutting head, wherein the chip gap extends along the first and the second cutting edge, so that the first passage is open towards the circumferential wall of the tool carrier in the region of the second cutting edge.

7. The cutting tool according to claim 5, wherein the first passage second surface has at least one coolant outlet, which faces the first blade and which is connected to the first coolant duct.

8. The cutting tool according to claim 7, wherein the coolant outlet comprises a groove that runs parallel to a cutting edge of the blade.

9. The cutting tool according to claim 1, wherein the circumferential wall has a cross sectional widening, which is directed inwardly, in the region of the cutting head end, wherein the at least one coolant duct is curved in such a way that coolant also flows through the cross sectional widening.

10. The cutting tool according to claim 1, wherein at least part of the first coolant duct is between the first passage and an outer surface of the circumferential wall, radially outward relative to the first passage.

11. The cutting tool according to claim 1, wherein at least part of the first coolant duct is between the chip-receiving space and an outer surface of the circumferential wall, radially outward relative to the chip-receiving space.

12. A method for making the cutting tool according to claim 1, wherein the tool carrier is produced by means of an additive manufacturing method by applying material to the clamping shank.

13. The method according to claim 12, wherein:
the method comprises forming a base section between the clamping shank and the tool carrier, the base section having a central coolant duct, and
the tool carrier is produced by means of an additive manufacturing method, by applying material to the base section.

14. The method for a cutting tool according to claim 12, wherein the additive manufacturing method is selective laser melting.

15. The method according to claim 12, wherein:
the method comprises forming a base section between the clamping shank and the tool carrier, the base section having a central coolant duct, and
the tool carrier is produced by means of selective laser melting, by applying material to the base section.

* * * * *